United States Patent
Zhang et al.

(10) Patent No.: US 7,020,699 B2
(45) Date of Patent: Mar. 28, 2006

(54) TEST RESULT ANALYZER IN A DISTRIBUTED PROCESSING FRAMEWORK SYSTEM AND METHODS FOR IMPLEMENTING THE SAME

(75) Inventors: Weiqiang Zhang, San Jose, CA (US); Konstantin I. Boudnik, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 943 days.

(21) Appl. No.: 10/026,192

(22) Filed: Dec. 19, 2001

(65) Prior Publication Data

US 2003/0131085 A1   Jul. 10, 2003

Related U.S. Application Data

(63) Continuation-in-part of application No. 09/953,223, filed on Sep. 11, 2001.

(51) Int. Cl.
*G06F 13/00* (2006.01)
(52) U.S. Cl. ..................... 709/223; 714/715
(58) Field of Classification Search ........ 709/200–203, 709/223–224; 714/715, 819–220
See application file for complete search history.

(56) References Cited

U.S. PATENT DOCUMENTS

| | | | | |
|---|---|---|---|---|
| 5,241,648 A | * | 8/1993 | Cheng et al. ................... | 707/7 |
| 5,537,603 A | * | 7/1996 | Baum et al. .................... | 707/1 |
| 5,701,471 A | * | 12/1997 | Subramanyam ............. | 707/200 |
| 5,742,754 A | | 4/1998 | Tse ........................ | 395/183.14 |
| 6,223,306 B1 | * | 4/2001 | Silva et al. .................... | 714/37 |
| 6,560,564 B1 | * | 5/2003 | Scarlat et al. ............... | 702/186 |
| 6,742,152 B1 | * | 5/2004 | Terry .......................... | 714/729 |

* cited by examiner

*Primary Examiner*—Moustafa M. Meky
(74) *Attorney, Agent, or Firm*—Martine Penilla & Gencarella LLP

(57) ABSTRACT

A system for analyzing test result data from a plurality of test systems capable of producing the test result data in disparate formats is provided. The system includes a data processing block, a memory data structure, and a database. The data processing block is designed to receive the test result data in the disparate formats so as to produce an identifiable result data. The memory data structure is designed to store the identifiable result data in a table format. The database stores the identifiable result data obtained from the memory data structure. The identifiable result data has a uniform format for analyzing the test result data from the plurality of test systems.

20 Claims, 9 Drawing Sheets

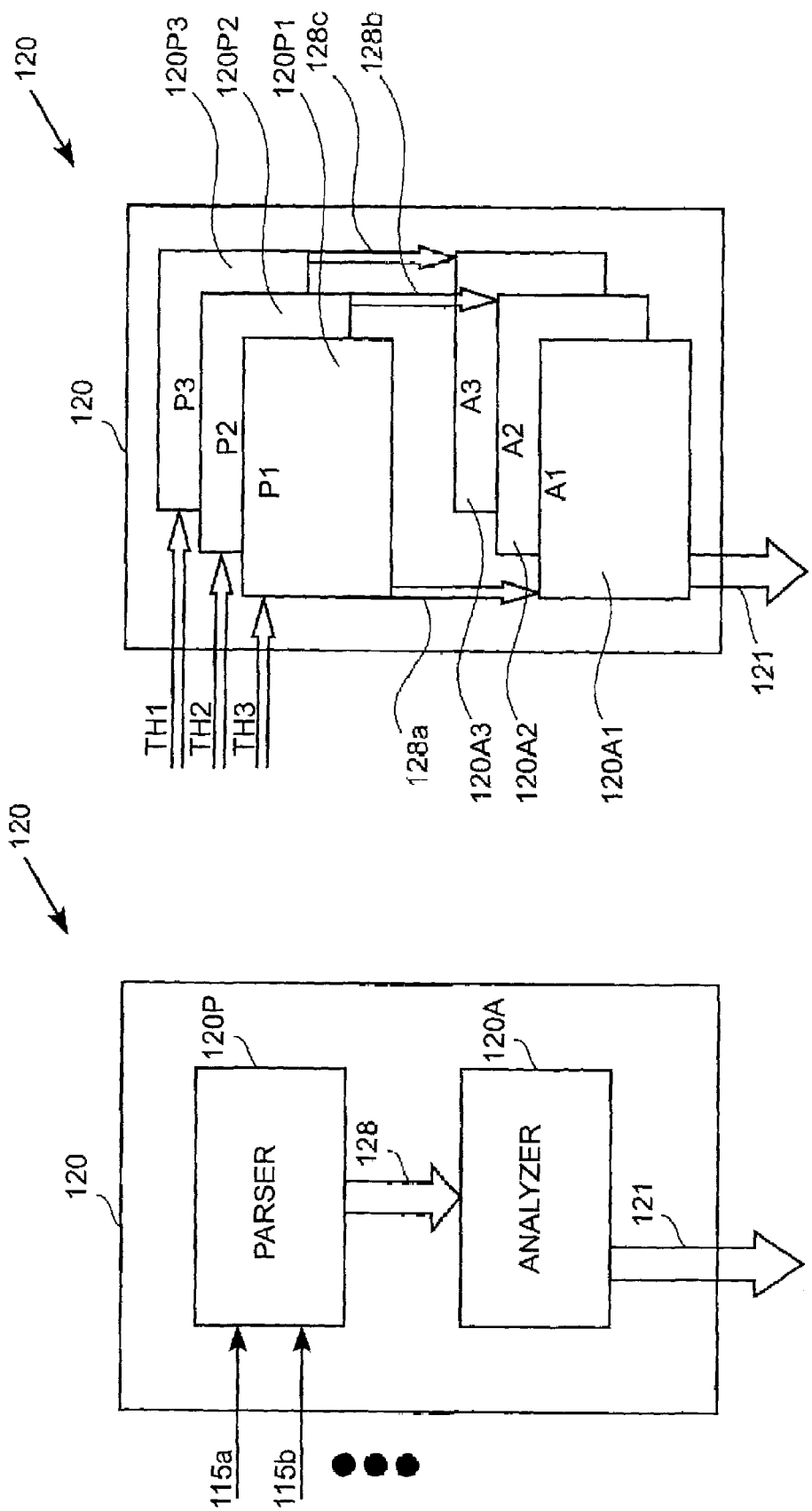

TEST RESULT ANALYZER IN A DISTRIBUTED PROCESSING FRAMEWORK SYSTEM AND METHODS FOR IMPLEMENTING THE SAME

CROSS REFERENCE TO RELATED APPLICATIONS

This application is a continuation-in-part of U.S. patent application Ser. No. 09/953,223, filed Sep. 11, 2001, and entitled "DISTRIBUTED PROCESSING FRAMEWORK SYSTEM," which is incorporated herein by reference in its entirety.

BACKGROUND OF THE INVENTION

1. Field of the Invention

The present invention relates generally to software processing, and more particularly, to methods and systems for storing and maintaining individually generated test results.

2. Description of the Related Art

As the use of software in performing daily tasks is increasing rapidly, assessing software reliability through software testing has become an imperative stage in the software development cycle. As is well known, software testing is used to find and eliminate defects (i.e., bugs) in software, which if undetected, can cause the software to operate improperly. In general, software testing may be performed by implementing a stand-alone computer or a network of computer resources. Typically, when the stand-alone computer system is used to execute a test, the stand-alone computer system must be manually programmed so as to run a test selected by the software user. That is, to submit a new test, modify or terminate an existing test, obtain the status of the tests currently running, view or analyze test results, the user must be able to physically access the computer lab and the stand-alone computer system.

Comparatively, when a network of computer resources is used, the users are responsible for manually adding and deleting the computer resources to the network, programming the master computer system and the server, initiating the running of a user-selected test, running the test on the group of dedicated computer systems coupled to the server, storing and maintaining the text or Hyper Text Markup Language (hereinafter, "HTML") files containing the test results, viewing the test result files, and analyzing the test results. Again, to perform any of these tasks, a user must have physical access to each of the dedicated computer systems, must manually view each test result file separately so as to extract important data, and must manually review and analyze the test result files so as to arrive at the statistical data incorporating data in each and every single test result file. As a consequence, accessing, viewing, or analyzing test results is an extremely time consuming task.

In either scenario, in addition to needing access to the computer lab housing the stand-alone computer, the master computer system running the network controller, or each dedicated test machine, at any given time, only one user at a time can view or analyze any test result file. That is, only the user having access to a specific test system is capable of viewing the test result residing on that test system. In this manner, each user has access and control over the test result files residing on the respective test system, thus giving the users the opportunity to delete the residing test result file, if the user so chooses.

Additionally, in either scenario, a heavy user interface is required for initiating the software testing on the master computer, scheduling the running of the specific test on the system resources, adding and deleting of the system resources, keeping track of the system resources and their respective hardware and software configuration, and maintaining the system resources. Moreover, in either case, the software testing is performed by dedicated system resources. That is, the system resources are designed to solely be used for software testing.

In view of the foregoing, there is a need for a flexible methodology and system capable of providing faster access to test results generated by a plurality of processing resources while reducing user control over test results.

SUMMARY OF THE INVENTION

Broadly speaking, the present invention fills these needs by providing a data base connection designed to implement a centralized data storage structure to store and maintain identifiable test results for further analysis and processing. In one embodiment, a plurality of test result files generated by executing a test suite are processed, extracting a plurality of identifiable result data that are easily recognizable by a computer system via a data structure. In one implementation, the identifiable result data are stored in a centralized and predefined memory structure. It should be appreciated that the present invention can be implemented in numerous ways, including as a process, an apparatus, a system, a device, or a method. Several inventive embodiments of the present invention are described below.

In one embodiment, a system for analyzing test result data from a plurality of test systems capable of producing the test result data in disparate formats is disclosed. The system includes a data processing block, a memory data structure, and a database. The data processing block is designed to receive the test result data in the disparate formats so as to produce an identifiable result data. The memory data structure is designed to store the identifiable result data in a table format. The database is designed to store the identifiable result data obtained from the memory data structure. The identifiable result data has a uniform format for analyzing the test result data from the plurality of test systems.

In another embodiment, a system for analyzing test result data from a plurality of test systems capable of producing the test result data in disparate formats is disclosed. The system includes a data processing block, a memory data structure, and a database. The data processing block is designed to receive the test result data in the disparate formats so as to produce an identifiable result data. The data processing block includes a parser component and an analyzer component. The parser component is configured to parse the test result data so as to extract valuable data from the test result data. The analyzer component is configured to analyze valuable data from the test result data so as to produce the identifiable result data. The memory data structure is configured to store the identifiable result data in a table format. The database is designed to store the identifiable result data obtained from the memory data structure. The identifiable result data has a uniform format for analyzing the test result data from the plurality of test systems.

In yet another embodiment, a method for creating a database connection in a distributed test framework (DTF) system is disclosed. The method includes providing a test suite containing a plurality of jobs. The method further includes executing each of the plurality of jobs on a test system of a plurality of test systems. Executing each of the plurality of jobs is configured to produce a test result file on each of the plurality of test systems. Also included in the method is processing each test result file so as to extract a respective identifiable result data. The method also includes storing the identifiable result data into a central memory data structure. Further included is storing a data in the central memory data structure into a database.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 4B is a block diagram depicting the processing of a plurality of test result files associated with a test suite using a parser component and analyzer component of a data processing block, in accordance to still another embodiment of the present invention.

FIG. 4C is a block diagram depicting the data processing component implementation of a parser component and an analyzer component having a type substantially identical to a test harness type of each test suite, in accordance to still another embodiment of the present invention.

DETAILED DESCRIPTION OF THE PREFERRED EMBODIMENTS

Figure 1:
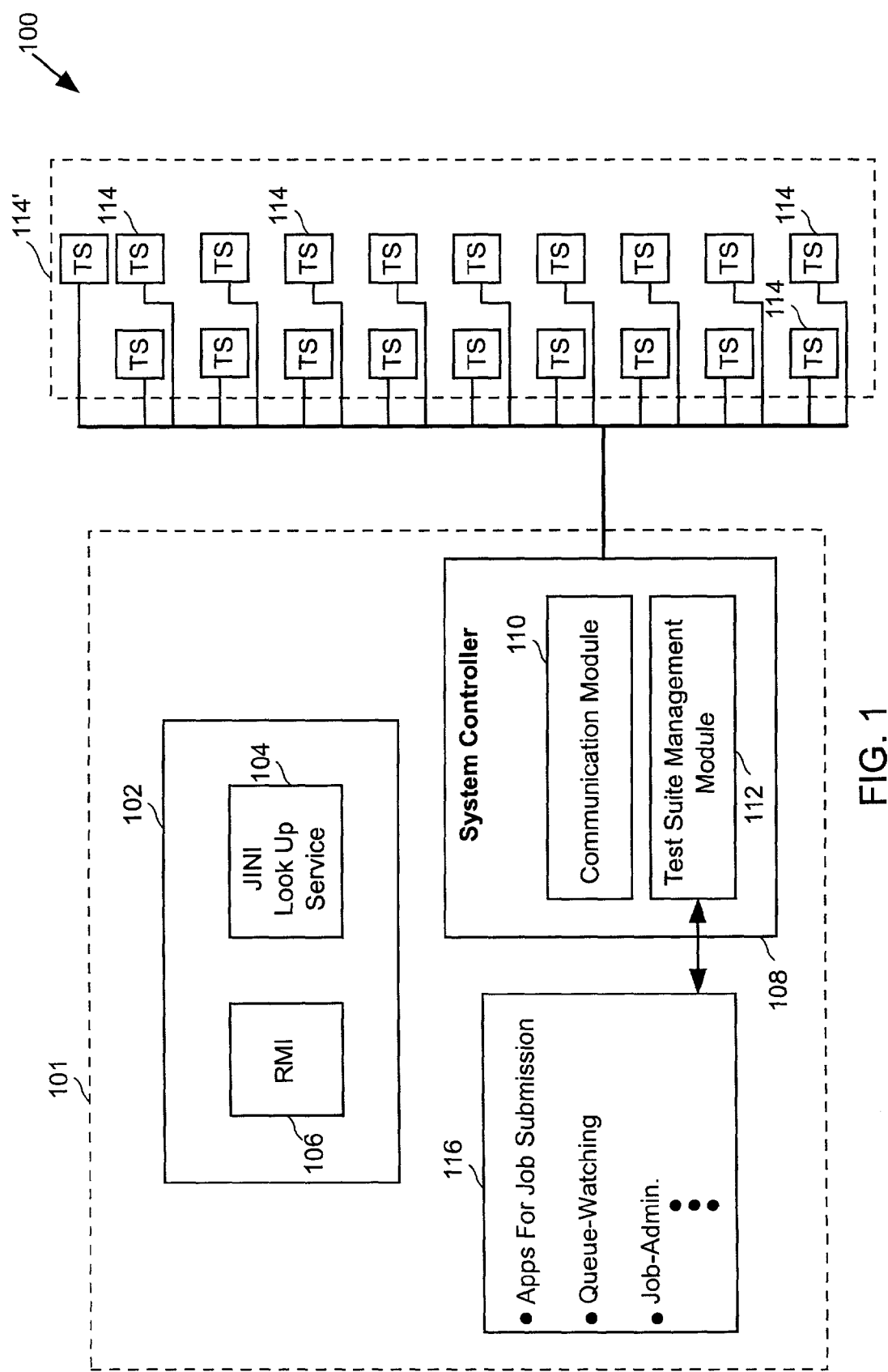
FIG. 1 is a block diagram illustrating a distributed test framework (DTF) system, in accordance with one embodiment of the present invention.

Inventions for a database connection implementing a centralized database storage in a distributed test framework (DTF) system and methods for implementing the same are disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the database connection of present invention creates a centralized predefined storage structure having a unique format, to store identifiable result data extracted from test result files generated by each test system of a plurality of test systems. In one example, the identifiable result data is extracted and subsequently analyzed implementing a data processing block. In one instance, the data processing block includes a parser component to extract identifiable data using each of the test result files generated by each test system. In this manner, an analyzer component of the data processing block can easily and automatically analyze the extracted data, substantially reducing the time consuming task of manually viewing and analyzing test results.

In one exemplary implementation, the database connection of the present invention implements a parser component to parse the test results so as to automatically extract the identifiable result data. In a different example, the database connection can be configured to implement a parser component and an analyzer component defined by a test harness type of a test suite. For instance, the database connection of the present invention includes a predefined parser for Tonga or Jtreg test harness types.

The DTF system includes a system controller configured to schedule, distribute, and manage a plurality of test suites being executed. In one embodiment, the system controller is configured to include a communication module and a test suite management module. The management module is responsible for managing the processing of a submitted process while the communication module designed to manage the communication between the system controller and the distributed processing resources.

In one exemplary embodiment, the system controller registers with a registry service (e.g., a look up service) allowing the plurality of user computer systems to locate the system controller, requesting a copy of the data center. Upon receiving such request, a copy of the data center is provided to the user computer system thus enabling the user to access the data in the data center. In one example, the system controller maintains the copies of the data center synchronized implementing a refresh command.

The system controller implemented in the DTF system is further configured to have the capability to intelligently select and utilize computer resources of the ad-hoc network of distributed computer resources having either the same or different software/hardware configuration to execute a process. As used herein, an "ad-hoc" or a "dynamic" network is defined as a network in which the processing resources may be part of the network temporarily and for a specific length of time (i.e., spontaneous). In one example, the system controller of the present invention is implemented in the DTF system and uses the Jini™ (hereinafter "Jini") technology to provide spontaneous interaction between its components. In this manner, the processing resources attach to and detach from the ad-hoc network of computer resources without disturbing the DTF system. Accordingly, the system controller of the present invention has the capability to manage the process being executed by a plurality of processing resources not solely limited to executing processes submitted to the DTF system.

In one implementation, the DTF system includes a server computer system and a plurality of ad-hoc network of resources configured to spontaneously interact implementing a device registry. The server computer system is configured to include the device registry (e.g., Jini look up service) and the system controller configured to manage the processing of the submitted test suites. In one instance, the plurality of test systems join the Jini look up service by registering their respective proxies and corresponding attributes. In one example, the system controller searches the look up service for an available and suitable test system to process each of the submitted test suites. Once a test system is selected to run the test suite, the machine service component of the selected computer resource spawns a second service to execute the test suite.

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping these brief overviews to Jini and Java as they relate to the present invention in mind, reference is now made to FIG. 1 illustrating a block diagram of a distributed test framework (DTF) system 100, in accordance with one embodiment of the present invention. As shown, physically, the DTF system 100 includes two groups of computer systems: (1) a system server group 101, and (2) a test system group 114'. The system server group 101 includes a service component 102 and a system controller 108. The service component 102 is configured to contain a Jini look up service 104 and a Remote Method Invocation (RMI) 106. In one embodiment, the RMI is designed to handle various communication needs. Comparatively, the Jini look up service 104 is a dedicated process running on the master computer system, server, and is configured to function as a central registry. As used herein, the master computer system is defined as the computer system running the system controller 108. As designed, in one embodiment, the master computer is configured to include both the system controller 108 and the service component 102. However, in a different implementation, each of the system controller 108 and the service component 102 may be included and run by separate computer systems. As designed, the look up service 104 is configured to enable the system controller 108 to locate available computer systems of an ad-hoc network of computer systems to execute a given test execution request using the test system registerable attributes. For instance, the look up service 104 includes registerable attributes, which identify the test machine platform, operating system, and other software and hardware characteristics.

The illustrated system controller 108 includes a data center component 109 and a user interface component 111. Broadly speaking, the user interface 111 is utilized to interact with the user computer systems. For instance, in one example, a user computer system interacts with the system controller by obtaining instances of the user interface component. The data center component 109 of the remote system controller 108 is configured to include substantially all data required to execute a test suite. By way of example, a sample data center may include data such as, the number of test execution requests currently being processed or waiting to be processed, the number of test systems available to execute a certain type of a test suite, the status of the test suites being executed, etc.

As shown, in one embodiment, the illustrated system controller 108 includes a communication module 110 and a test suite management module 112. The communication module 110 manages the communication between the system controller 108 and the distributed test systems 114. For instance, the communication module 110 is responsible for locating available test systems 114, running test execution requests, and gathering information regarding the status of the test systems 114. In one example, the system controller 108 manages the communication with the distributed test systems 114 by implementing a plurality of threads. In this manner, the system controller 108 has the capability to communicate with a plurality of test systems 114 in parallel. However, it must be noted that in a different embodiment, the system controller 108 may implement any suitable mechanism to manage the communication between the system controller 108 and the distributed test systems 114 (e.g., Jini, RMI, Transport Commit Protocol/Internet Protocol (TCP/IP) sockets, etc.).

The test suite management module 112 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 112 maintains an inqueue directory designed to include almost all the submitted test execution requests. Once the system controller 108 is initiated, the system controller 108 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 112 is configured to manage the software applications and user interfaces implemented for job submission, queue watching, job administration, etc., as shown in 116.

The test system group 114' includes a plurality of test systems 114 having similar or diverse hardware and software configuration. Although shown as a group, the test systems 114 are not necessarily limited to testing. In fact, the test systems 114 can be computers or systems used by employees of a company for normal desktop work. So long as the test systems 114 are associated with the networked group, the processing power of these test systems 114 can be used. In one embodiment, the test systems 114 can be used during normal working ours when the test systems 114 are running, for example, business applications, or during off hours, thus tapping into potentially huge processing resources that would otherwise be left unused. It should therefore be appreciated that test systems 114 do not necessarily have to be solely dedicated to testing or processing for the system server group 101.

In one embodiment, the test systems 114 are configured to execute the test execution requests dispatched by the system controller 108. Each of the test systems 114 runs an agent process (not shown in this Figure) designed to register the respective test system 114 with the Jini look up service 104. In this manner, the agent process for each test system 114 advertises the availability of the associated test system 114. As will be discussed in further detail below, a machine service component of the agent is used to establish communication between the associated test system 114 and the system controller 108. Specifically, by implementing the Jini attributes, the machine service registers the test system 114 characteristics with the Jini look up service 104. The test system 114 attributes are subsequently used by the system controller 108 to locate a test system 114 suitable to execute a specific test execution request.

While the DTF system 100 can physically be divided into two groups, logically, the DTF system 100 is comprised of three over all parts: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Finds substantially all the processes, and once found kills each of the processes, individually.

Submit jobs: Before the system controller 108 is launched, an Extensible Markup Language (XML) formatted test-execution-request file is created in the inqueue directory (e.g., that is preferably part of the test suite management module). In this manner, once the system Controller 108 is launched, the system controller 108 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 108 is configured to implement various input files.

The second logical component, the test scheduler and system controller, includes the system controller 108 configured to perform the function of managing the job queues and dispatching the test execution requests to test system 114 for processing. Thus, the system controller 108 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 108 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 114 having the required characteristics is available to execute the job.

In accordance with one implementation, the requirements for a DTF system are provided below in Table 1.

TABLE 1

Client-Server Test Frame Requirements

| Requirements | | Accessments | Notes |
|---|---|---|---|
| Tool Requirements (e.g., javatest, jtreg, tonga, shell, etc.) | | Green | |
| Test Execution Requirements | Clean Environment | Green | |
| | Setup | Green | |
| | Execute test suite | Green | |
| | Post-processing | Red | In one example, there are no post actions. |

TABLE 1-continued

Client-Server Test Frame Requirements

| Requirements | | Accessments | Notes |
|---|---|---|---|
| | Get test results | Green | |
| | Clean Environment | Green | |
| Other Requirements | | | |
| Error Handling | Crashing | Yellow | In one example, |
| | Hanging | Yellow | a method is implemented to stop the system. |
| Notification (When done) | | Green | |
| Machine Requirements (MKS, Patches) | | Green | |
| Test Suites Available | | Yellow | In one example, a suite path is passed through a plurality of command arguments |
| JDKs Available | | Yellow | In one embodiment, java.exe is in the path environment. |
| Machine Use Detection | | Red | |
| Queue Test Suites | | Red | |
| GUI Requirements | | | |
| Machine Characteristics Matrix | | Red | |
| Result Comparison | | Red | |
| Golden JDK results | | Red | |
| Stop/Destroy Test | | Green | |
| User Profiles/Managements | | Red | |
| Logs | | Green | |
| Test Result Notification | | Red | |
| Scheduling Test | | Red | |
| Machine Statistics (Idle time, Usage Profile) | | Red | |
| Error Recovery (Net Problems) | | Red | |
| Fault Tolerant | | Yellow | In one example, fault tolerant is performed by a plurality of actions based on coordination protocol, thus minimizing faults. |
| Scaleable | | Green | In one embodiment, test suites can be easily added or deleted. |
| Demon Requirements | Version # (Compatibility) | Red | |
| | Machine Descriptions | Yellow | In one example, Demon Requirements are the basic configurations (e.g., OS, version, etc.). |

Figure 2:
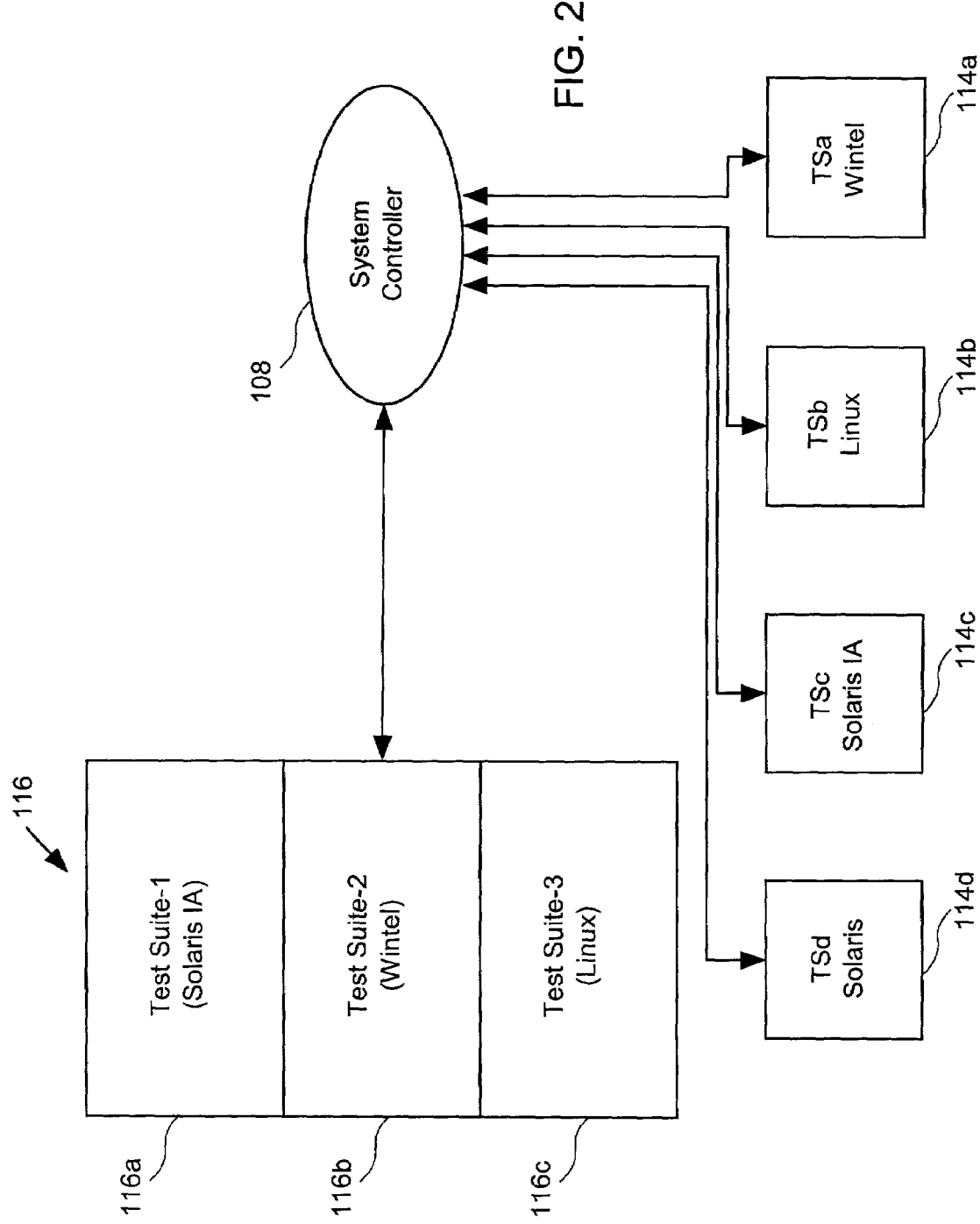
FIG. 2 is a block diagram illustrating the capability of the present invention to intelligently locate an available and suitable test system to execute a test suite, in accordance with another embodiment of the present invention.

Reference is made to a block diagram depicted in FIG. 2 wherein the capability of the DTF system to intelligently locate a test system 114 available to execute a test suite is illustrated, in accordance with one embodiment of the present invention. As shown, an inqueue directory 116 contains a plurality of test execution requests 116a, 116b, and 116c. In accordance with one embodiment of the present invention, once the system controller 108 is initiated, the system controller 108 is designed to read each test execution request 116a–116c contained within the inqueue directory 116. As shown, each test suite request 116a–116c must be executed by a test system 114 capable of running the test execution request requirements. For instance, each of the test execution requests 116a, 116b, and 116c must be run on a Solaris IA™ test system, a Wintel™ test system, or a Linux™ test system, respectively. As will be described in more detail below, the DTF system 100 has the capability to advantageously locate an available test system from a plurality of ad-hoc network of test systems 114a, 114b, 114c, and 114d to execute each of the test execution requests 116a–116c.

As shown in the embodiment depicted in FIG. 2, each of the test systems 114a–114d has a different software and hardware configuration. For instance, while the test system 114a is run on Wintel™ and the test system 114b is run on Linux™, the test systems 114c and 114d are programmed to run on Solaris IA™ and Solaris™, respectively. As will be discussed in more detail below, the machine service for each test system 114a–114c registers the respective test system 114a–114c with the Jini look up service using the Jini attributes. Particularly, the embodiments of the present invention are configured to register the hardware and software configuration for each test system 114a–114d with the Jini look up service 104. In this manner, the system controller 108 can search the Jini look up service 104 implementing the test execution request requirements as search criteria. Thus, as shown in the example of FIG. 2, the system controller 108 of the present invention selects the test systems 114c, 114a, and 114b to execute the test suite requests 116a–116c, respectively.

Figure 3:
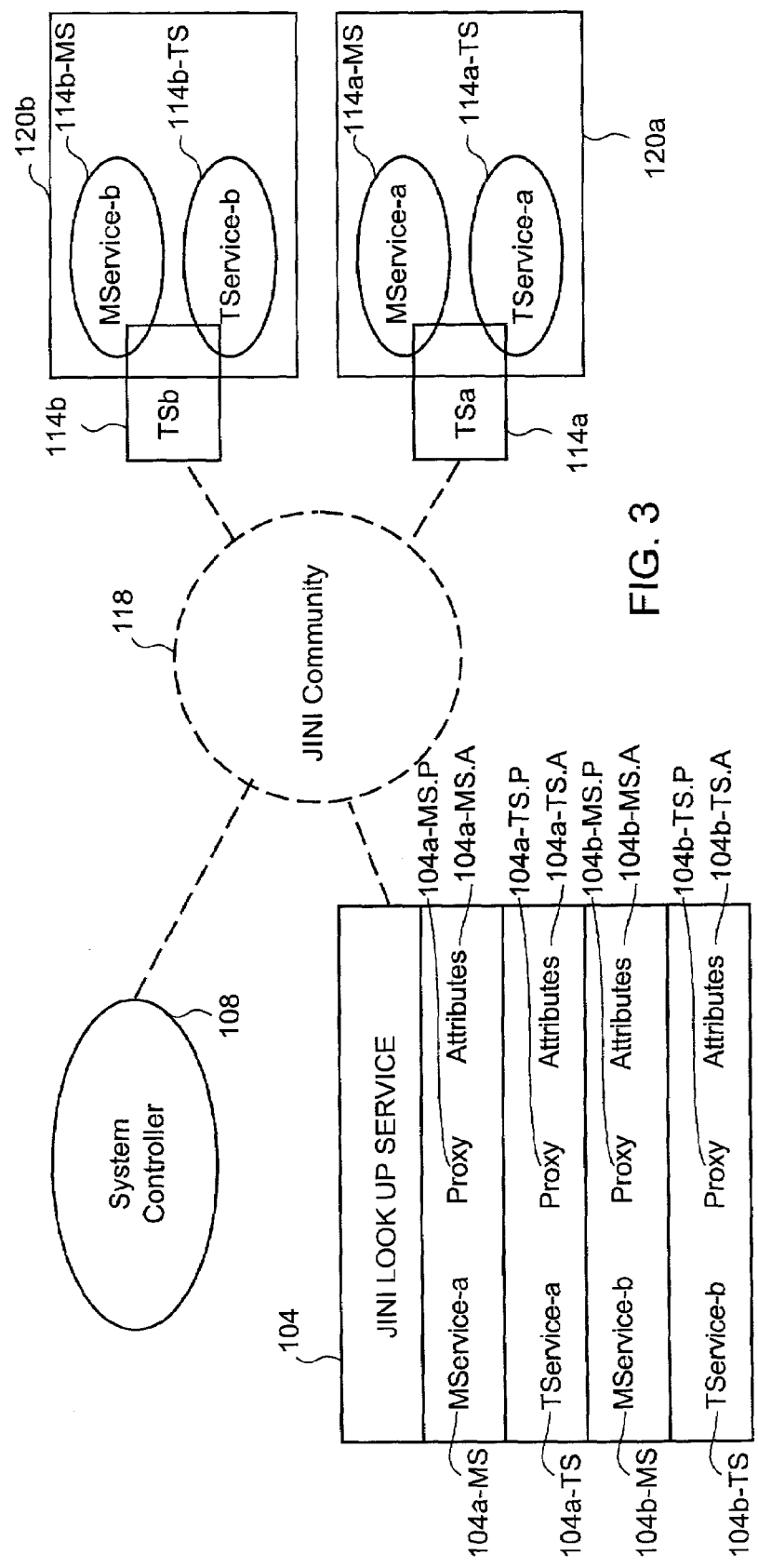
FIG. 3 is a block diagram illustrating the implementation of the test system attributes to locate a suitable test system to process a test execution request, in accordance with yet another embodiment of the present invention.

Implementing the test system attributes to locate a suitable test system to run a test execution request can further be understood with respect to the block diagram shown in FIG. 3, in accordance with one embodiment of the present invention. As shown, the test systems 114b and 114a, the system controller 108, and the Jini look up service 104 communicate to each other using Jini. In one example, the system controller 108, the Jini look up service 104, and the test systems 114a and 114b and all the other resources that are Jini enabled form a virtual Jini community 118.

As shown, the test system 114a runs an agent process 120a responsible for notifying the Jini look up service 104 of the existence and configuration of the test system 114a. In one example, the agent 120a is also designed to export a downloadable image of itself. Beneficially, the downloadable image allows the system controller 108 to ask the test system 114a to initiate running a test execution request while interacting with the test system 114a as the test execution request is being processed.

The illustrated agent 120a involves two Jini services, machine service 114a-MS and test service 114a-TS. The function of the machine service 114a-MS is to advertise the availability of the test system 114a, the characteristics of the test system 114a, and the ability of the test system 114a to launch a test execution request. Additionally, the machine service 114a-MS is designed to be present on the test machine 114a at all times. As such, the machine service 114a-MS is initiated on the test system 114a at the start-up time and is configured to remain active on the test system 114a until the test system 114a is shut down.

Comparatively, the test service 114a-TS is a module configured to encapsulate the test execution request. As designed, the test service 114a-TS is spawned by the machine service 114a-MS and is subsequently launched when the machine service 114a-MS receives a request to start running a test execution request from the system controller 108. Specifically, the new test service 114a-TS is spawned based on the test execution request type. By way of example, in one embodiment, the machine service 114a-MS spawns separate test systems 114a-TS when running Tonga-type, JCK-type, JTREG-type, and shell-type test suites. However, one having ordinary skill in the art must appreciate that in a different example, the machine services are configured to spawn other suitable test systems. As shown, similar to test system 114a, the test system 114b is configured to include an agent 120b designed to include a machine system 114b-MS and a test system 114b-TS.

As will be discussed in more detail below and as shown in the implementation of FIG. 3, the machine service 114a-MS and test service 114a-TS, respectively, register Jini attributes 104a-MS.A and 104a-TS.A of the test system 114a with the Jini look up service 104. For instance, in one embodiment, the sequence of events in registering the machine service 114a-MS and test service 114a-TS may be as follows: Once the test-system 114a discovers and joins the Jini community 118, the test service 114a-MS of the test system 114a registers with the Jini look up service 104. In this manner, the machine service 114a-MS registers a machine service proxy 104a-MS.P and the attributes 104a-MS.A of the machine service 114a-MS with the look up service 104. The Jini attributes 104a-MS.A are then used by the system controller 108 to locate a test service having attributes suitable to run the test execution request.

Once the test system 114a has been selected to run the test execution request, the machine service 114a-MS spawns a test service 114a-TS having the same type as the test execution request. As discussed above, the machine service 114a-MS is configured to spawn a matching test service 114a-TS for each test execution request type. For example, the test system 114a may have the attributes to run a Tonga test execution request and a JTREG type test execution request. In such a situation, the Jini look up service 104 will include two test services each running a different type of test execution request. As a consequence, when the processing of one type of test execution request has concluded, the test service 114a-TS having substantially the same type can be terminated. Thus, for the most part, the test service 104a-TS, 104a-TS.A, and 104-TS.P are designed to substantially exist while the test system 114a is running a test execution request. In this manner, the system controller 108 can determine whether the test system 114a is processing a test execution request. Specifically, this is achieved by the system controller 108 simply querying the Jini look up service 104 as to whether the test system 114a has an associated existing test service.

In addition to registering the attributes 104a-MS.A and 104a-TS.A, the machine service 114a-MS and the test system 114a-TS are configured to respectively register a corresponding machine service proxy 104-MS.P and a respective test service proxy 104-TS.P with the Jini look up service 104. As designed, the system controller 108 implements the machine service proxy 104-MS.P and the test service proxy 104-TS.P to communicate with the test system 114a. Particularly, once the system controller 108 has selected the test system 114a to run the test execution request, the system controller 108 downloads the machine service proxy 104-MS.P from the Jini look up service 104. Once the machine service proxy 104-MS.P is downloaded, the system controller 108 starts communicating with the machine service proxy 104-MS.P rather than communicating directly with the corresponding test system 114a or the machine service 114a-MS.

In a like manner, the test service proxy 104-TS.P is the communication channel between the system controller 108 and the test service 114a-TS. Thus, similar to the machine service 114a-MS, the system controller 108 downloads the test service proxy 104-TS.P from the Jini look up service 104. Thereafter, the system controller communicates with the test service proxy 104-TS.P as if communicating with the test system 114a or the test service 114a-TS. As shown, in the same manner, the machine service 114b-MS and test service 114b-TS register their respective machine service proxy 104b-MS.P and machine service attributes 104b-MS.A as well as the respective test service proxy 104b-TS.P and test service attributes 104b-TS.A with the Jini look up service 104.

Figure 4A:
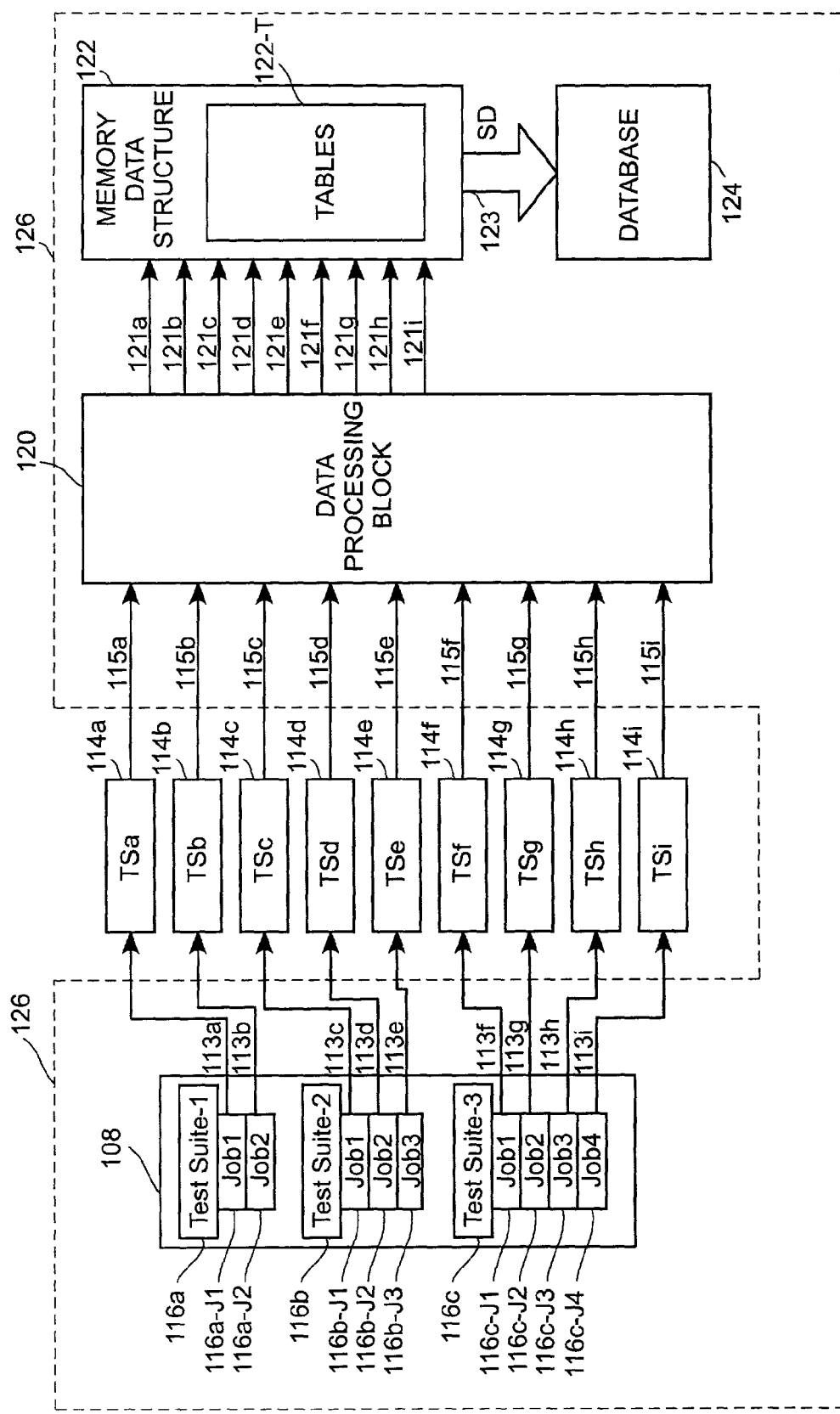
FIG. 4A is a block diagram illustrating the database connection under the DTF system, in accordance to yet another embodiment of the present invention.

The database connection of the present invention through creating a centralized predefined database is illustrated by way of the block diagram shown in FIG. 4A, in accordance to one embodiment of the present invention. As shown, an exemplary database connection of the DTF system includes a data processing block 120, a memory data structure 122, and a database 124 configured to respectively extract identifiable data using the raw test result generated by a plurality of test systems 114a–114i and to subsequently store same into a database.

As shown, the system controller 108 distributes the execution of a plurality of test suites 116a–116c to a plurality of respective test systems. As discussed in more detail above, each of the test suites may be configured to include a plurality of jobs. For instance, the test suite 116a includes a pair of jobs 116a-J1 and 116a-J2, the execution of each has been assigned to the respective test system 114a–114b, using a corresponding connector 113a and 113b. As designed, each test system 114a and 114b generates a test result 115a and 115b, respectively. In one instance, each of the test results has a disparate format. By way of example, each of the test results 115a and 115b may be configured to be in an HTML or text file format. Irrespective of the format, each of the test results 115a and 115b includes a wide spectrum of valuable and invaluable data. For instance, in one example, almost 20 percent of data within a test result file may be useful which extraction requires a thorough review of each file. To extract substantially all the useful data, each test result file 115a and 115b is fed into a data processing block 120 which in turn generates a corresponding identifiable result data 121a and 121b. That is, once extracting the identifiable data (i.e., useful data) contained within each file 115a and 115b is concluded the data processing block generates the corresponding identifiable result data 121a and 121b. As designed, each identifiable result data 121a and 121b file contains useful data, which are easily identifiable and recognizable by a computer system, thus accessing valuable data substantially easier.

In a like manner, each of the plurality of jobs 116b-J1, 116b-J2, and 116b-J3 of the test suite 116b is assigned to a corresponding test system 114c–114e, utilizing a plurality of respective connectors 113c–113e. Upon executing each of the jobs 116b-J1, 116b-J2, and 116b-J3, each of the respective test systems 114c–114e generates a corresponding test result 115c–115e, each of which is communicated to the data processing block 120. The data processing block will in turn generate a plurality of corresponding identifiable test data 121c–121e. Again, the identifiable test data 121c–121e files are configured to include valuable data extracted from each of the test result files 115c–115e, correspondingly.

System controller 108 is shown to have comparably distributed the execution of a plurality of jobs 116c-J1 through 116c-J4 of test suite 116c to a plurality of test systems 114f–114i, using the corresponding connectors 113f–113i. In a like manner, a plurality of test result data 115f–115i files, each generated by the respective test system 114f–114i are communicated to the data processing block 120, which in turn generates the plurality of respective identifiable test data 121f–121i.

The identifiable test data 121a and 121b associated with the test suite 116a, identifiable test data 121c–121e associated with the test suite 116b, and the identifiable test data 121f–121i associated with the test suite 116c are configured to be stored in the memory data structure 122. In one example, the identifiable test data 121a–121i are stored in a table 122-T, which in one embodiment, is a hash table. Additional 110 information regarding the predefined memory data structure is provided below.

Upon completion of temporarily storing the identifiable test data 121a–121i into the predefined memory data structure 122, a stored data 123 is stored into the database 124, creating a centralized database for the plurality of test results generated by the plurality of test systems 114a–114i. As shown, in one example, the processing of the test results 115a–115i, the temporarily storing of the identifiable test data 121a–121I, and storing of the stored data 123 into the database 124 are performed by the system controller component 108 of the DTF system.

In one embodiment, the memory data structure 122 implements a hash table to temporarily store identifiable data. In this manner, the valuable data for jobs associated with each test suite and each test system can be stored into a table using a universal format. For instance, in one example, the hash-table can include the attributes and types shown in Table 1 below.

TABLE 1

Exemplary Hash Table

| attribute | type | comment |
|---|---|---|
| tID | number | In one instance, the primary key of the table. |
| host | varchar2(16), | In one example, it is the Hostname. |
| addr | varchar2(15), | In one embodiment, it is the IP address of the machine. |
| os | varchar2(10), | In one instance, it is the OS name. |
| arch | varchar2(10), | By way of example, it is the architecture of the machine |
| over | varchar2(8), | In one embodiment, it is the OS version. |
| vendor | varchar2(11) | In one implementation, it is the different Linux release name. |
| Iver | varchar2(10) | In one example, it is the Linux release version. |
| locale | varchar2(32), | In one embodiment, it is the Locale. |
| jpath | varchar2(256), | In one implementation, it is the JDK path. |
| jver | varchar2(16), | In one instance, it is the JDK version. |
| jopt | varchar2(512), | In one embodiment, it is the run time option. |
| tname | varchar2(256), | In one implementation, it is the test suite name. |
| ttype | varchar2(10), | In one instance, it is the Test Suite type. |
| stime | date, | For instance, it is the start time of the test. |
| etime | date, | In one implementation, it is the end time of the test. |
| job | varchar2(256), | In one embodiment, it is the Job name. |
| uname | varchar2(16), | In one implementation, it is the user who runs the test. |
| gname | varchar2(32) | In one embodiment, it is the group name of test. |
| cus1 | varchar2(32) | In one instance, theses are the customized field. |
| cus2 | varchar2(32) | |
| cus3 | varchar2(32) | |
| cus4 | varchar2(32) | |
| cus5 | varchar2(32) | |

Thus as shown in Table 1, valuable information such as the test system, host name, test machine address, the type and version of the test machine operating system, test machine architecture, etc. are extracted from each of the test result files 115a–115e, and placed into a temporary storage having a predefined format. Additionally, as shown in Table 2, an exemplary patch table may be installed on each of the test systems 114a–114e.

TABLE 2

Exemplary Patch Table

| ATTRIBUTE | TYPE | COMMENT |
|---|---|---|
| tID | number | In one implementation, this is a foreign key configured to refer to tID of table test. |
| patch | varchar2(256) | In one example, it is configured to include the patches related to the test. |

In a like manner, a Fail Table and a Pass Table can be implemented to keep track of the number of passes and failures in running each job. Exemplary Fail Table and Pass Table are shown below in Tables 2 and 3, respectively.

TABLE 3

Exemplary Fail Table

| ATTRIBUTE | TYPE | COMMENT |
|---|---|---|
| tID | number | The foreign key refers to tID of table test |
| name | varchar2(256) | Name of test case |

TABLE 4

Exemplary Pass Table

| ATTRIBUTE | TYPE | COMMENT |
|---|---|---|
| tID | number | In one example, the foreign key refers to tID of table test. |
| name | varchar2(256), | For instance, it is a name of test case |
| error | LONG RAW | The error message compressed with zip |

In addition to pass and fail data, additional tables may be used to store other useful data (e.g., the name of the bug for which a test is run). Table 5 is an illustration of an exemplary Bug Table.

TABLE 5

Exemplary Bug Table

| ATTRIBUTE | TYPE | COMMENT |
|---|---|---|
| tID | number | In one embodiment, the foreign key refers to tID of table test. |
| bugID | varchar2(10) | In one instance, it is a Bug ID. |

It must be noted by one having ordinary skill in the art that although the embodiments of the present invention have been shown to have implemented a table as a temporary data storage structure, in a different example, any appropriate storage structure suitable for providing fast and convenient access to information may be implemented (e.g., arrays having a predefined index, data classes dedicated for data, etc.)

By storing the valuable data in the form of identifiable test data in the memory data structure 122, substantially all valuable data can be stored in the database 124 in the predefined format, almost eliminating the necessity to review a test result for a second time. In this manner, the database connection of the present invention substantially reduces the extent of control of the user of each test system on the test results, thus eliminating the possibility of losing result data due to the individual user deleting a test result file. Furthermore, beneficially, extracting of identifiable data is performed such that the initial test result files are left substantially intact.

Reference is made to FIG. 4B illustrating the processing of a plurality of test result files 115a and 115b associated with the test suite 116a using a parser component 120P and analyzer component 120A of the data processing block 120, in accordance with one embodiment of the present invention. As depicted, the illustrated pair of test result files 115a and 115b are communicated to the parser component 120P which in one example, is configured to extract valuable data from the pool of data contained within each of the test result files 115a and 115b. As previously stated, the parser component 120P is configured to parse through each test result file irrespective of its text format or HTML format. In one example, the parser component 120P is configured to understand a syntax of the file and is capable of extracting a plurality of keywords.

Subsequent to extracting the valuable data 128, the parser component 120P communicates the valuable data 128 to the analyzer component 120A, designed to analyze the valuable data 128, if so requested. In one example, the analyzer component 120A is configured to understand the meaning of the extracted data and keywords. In one example, the analyzer recognizes the meaning of each pair of strings and uses the meaning to fill in the memory structure. Furthermore, the analyzer component 120 can be implemented to arrive at a given statistical data using the individual test result files 115a and 115b. Upon the analyzer component 120A concluding its task, the analyzer component produces the identifiable result data 121, which is subsequently stored in the predefined memory data structure 122.

In one implementation, as illustrated in FIG. 4C, the data processing component 120 is configured to implement a parser component and an analyzer component which type is substantially identical to a test harness type of each test suite, in accordance with one embodiment of the present invention. As shown, the data processing block 120 includes a plurality of parser components 120P1, 120P2, and 120P3, each is configured to correspondingly be utilized to parse the test result of test harnesses TH1, TH2, and TH3. In a like manner, each of the valuable data 128a, 128b, and 128c associated with each of the parser components 120P1, 120P2, and 120P3 are communicated to the respective analyzer component 120A1, 120A2, and 120A3. Once the analysis of the valuable data 128a, 128b, and 128c has concluded, each of the analyzer components 120A1 through 120A3 provides an associated identifiable test data shown by 121. In this manner, the system controller 108 of the DTF system parses the valuable data using predefined parser codes associated with a test harness type. For instance, the predefined parser component 120P3 may be defined as the parser code for a test suite having a Tonga test harness type while the predefined parser component 120P2 can be implemented to parse through a valuable test result of a test suite having a Jtreg test harness type.

By way of example, the test results produced by executing test suites using Tonga test harness is configured to have a substantially similar format. In one exemplary embodiment, a Tonga test result format is configured to include the exemplary files and directories shown in Table 6.

TABLE 6

Exemplary Tonga Files and Directories

| FILE NAME | DESCRIPTION |
|---|---|
| Tonga.log | In one embodiment, it includes substantially the entire run time configuration parameters and properties. |
| testlist.fail | In one implementation, it includes a list of tests failed. |
| Testlist.pass | In one example, it includes a list of the tests passed. |

TABLE 6-continued

Exemplary Tonga Files and Directories

| FILE NAME | DESCRIPTION |
|---|---|
| Testlist.work | In one embodiment, it includes a list of test currently running. |
| <username>.<os>.<arch> | In one implementation, it is a directory that contains the detailed test results. |

For instance, a first half of the Tonga.log file is configured to contain substantially all the parameters and their associated properties in the format:

~Name=Value (With ~ representing the beginning of the line.) Comparatively, as shown in Table 7, the second half of the tonga.log file is configured to contain the start and end time of each test run.

TABLE 7

Test Run Start and End Time

| NAME | PARAMETER/PROPERTY |
|---|---|
| JDK_VERSION | In one example, this is the version of JDK. |
| JAVA_OPTS | For instance, this is the run time options for JVM. |
| JVAC_OPTS | In one embodiment, this is the options for the java compiler. |
| OS_ARCH | In one implementation, this is the architecture of machines (e.g. spare). |
| OS_VERSION | By way of example, this is the version of the OS. |
| OS_NAME | In one embodiment, this is the name of OS (e.g. Solaris). |

Thus, as in one exemplary embodiment, the Tonga test results are configured to have a substantially similar format; a parser code has been specifically written for Tonga test results format. An exemplary Tonga parser code is provided below in Table 8.

TABLE 8

Tonga Parser Code

```
package knight.controller.dbc;
import java.util.*;
import java.io.*;
import org.apache.log4j.Category;
public class TongaTestInfo implements TestInfo, TableAttributes {
    static String envFile = "Tonga.log";
    static String sumFile = "summary.report";
    static String passFile = "testlist.pass";
    static String failFile = "testlist.fail";
    String dirName;
    String user, os, arch;
    static Category cat = Category.getInstance(TongaTestInfo.class.getName( ));
    public TongaTestInfo( String dir ){
        dirName = dir;
    }
    public Hashtable getTestInfo( ){
        Hashtable res = new Hashtable( );
        res.putAll( getEnv( dirName + "/" + envFile ) );
        String tmp = getTestList( dirName + "/" + passFile );
        if(tmp!=null)
            res.put( "Pass", tmp );
        tmp = getFailList( dirName + "/" + failFile );
        if(tmp!=null)
            res.put( "Fail", tmp );
        return res;
    }
    String getValue( String line ){
```

TABLE 8-continued

Tonga Parser Code

```
            int ind = line.indexOf( '=' );
            if(ind==-1)
                return "N/A";
            else {
                return line.substring(ind+1).trim( );
            }
        }
    }
    Hashtable getEnv(String filename){
        Hashtable res = new Hashtable( );
        try {
            RandomAccessFile raf = new RandomAccessFile( filename, "r" );
            String line;
            while ( (line=raf.readLine( ))!=null ){
                if (line.startsWith("OS_ARCH")){
                    res.put("Arch", getValue(line) );
                    arch = getValue(line).trim( );
                } else if ( line.startsWith("OS_NAME") ){
                    res.put("OS", getValue(line) );
                    os = getValue(line).trim( );
                } else if (line.startsWith( "OS_VERSION") ){
                    res.put("OSVer", getValue(line) );
                } else if (line.startsWith("JDK_VERSION") ){
                    res.put("JDKVer", getValue(line) );
                } else if (line.startsWith( "JAVA_HOME") ){
                    res.put("JDKPath", getValue(line) );
                } else if (line.startsWith("localHost") ){
                    res.put("Host", getValue(line) );
                } else if (line.startsWith("USER") ){
                    user = getValue(line).trim( );
                }
            }
        } catch (IOException e){
            cat.error("Error in getEnv: ", e);
        }
        return res;
    }
    String getTestList( String filename ) {
        String res=null;
        try{
            RandomAccessFile raf = new RandomAccessFile( filename, "r" );
            String line;
            while ( (line=raf.readLine( ))!=null ){
                if (res==null)
                    res = line;
                else {
                    res = res + EFS + line;
                }
            }
        } catch (IOException e){
            cat.error("Error in getTestList: ", e);
        }
        return res;
    }
    String getFailList( String filename ) {
        String res=null;
        try {
            RandomAccessFile raf = new RandomAccessFile( filename, "r" );
            String line;
            while ( (line=raf.readLine( ))!=null ){
            String emsg = readErrorFile( getFileName(line) );
            if (emsg!=null){
                line = line + IFS + emsg;
            }
            if(res==null)
                res = line;
            else {
                res = res + EFS + line;
            }
        }
    } catch (IOException e) {
        cat.error("Error in getFailList: ", e);
    }
    return res;
}
```

TABLE 8-continued

Tonga Parser Code

```
String getFileName( String line ){
        int ind = line.indexOf(" ");
        if (ind!=-1){
                ind = line.indexOf( " ", ind+1 );
        }
        String result=null;
        if (ind!=-1) {
                String name = line.substring(ind+1);
                result = dirName + "/" + user + "." + os + "." +
                        arch + "/" + name + "/" + name + ".cerr0";
        }
        return result;
}
String readErrorFile( String filename ) {
        if ( filename==null ) return null;
        String result = null;
        try {
                File f = new File(filename);
                if ( f.isFile( ) ){
                        RandomAccessFile raf = new RandomAccessFile(f, "r");
                        String line;
                        while ( (line=raf.readLine( )) != null ){
                                if (result==null) {
                                        result=line;
                                } else {
                                        result = result + "\ " + line;
                                }
                        }
                }
        } catch (Exception e){
                cat.error("Error reading error file: ", e);
                //result=null;
        }
        return result;
    }
}
```

In a different embodiment, the test suite can be run using the Java Test for Regression ("Jtreg"). In one example, a format of results produced using the Jtreg test harness differs from the format of results produced using the Tonga test harness. In one embodiment, when the test harness type of a test suite is Jtreg, the DTF system implements a predefined Jtreg parser to parse the generated test results. An exemplary predefined Jtreg parser is shown in Table 9.

TABLE 9

Exemplary Jtreg Parser

```
package knight.controller.dbc;
import java.lang.*;
import java.util.*;
import java.io.*;
import org.apache.log4j.Category;
public class JTregTestInfo implements TestInfo, TableAttributes {
        static String envFile = "env.html";
        static String sumFile = "summary.txt";
        static String passFile = "testlist.pass";
        static String failFile = "testlist.fail";
        String dirName;
        static Category cat = Category.getInstance(JTregTestInfo.class.getName( ));
        public JTregTestInfo( String dir ){
                boolean wrapper;
                {
                        wrapper = (new File(dir+"/Total.report")).exists( );
                }
                if (wrapper){
                        dirName = dir+"/Total.report";
                }else{
                        dirName = dir;
                }
        }
        public Hashtable getTestInfo( ){
                Hashtable res = new Hashtable( );
                res.putAll( getEnv( dirName + "/" + envFile ) );
```

TABLE 9-continued

Exemplary Jtreg Parser

```
            res.putAll( getTestList( dirName + "/" + sumFile ) );
            return res;
    }
    String getValue( String line ){
            int ind = line.indexOf( "<td>", 10 );
            if (ind==-1)
                    return "N/A";
            else {
                    return line.substring(ind+4).trim( );
            }
    }
    Hashtable getEnv(String filename){
            Hashtable res = new Hashtable( );
            try {
                    RandomAccessFile raf = new RandomAccessFile( filename, "r" );
                    String line;
                    while ( (line=raf.readLine( ))!=null ){
                            if (line.startsWith("<tr><td>os.arch")){
                                    res.put("Arch", getValue(line) );
                            } else if ( line.startsWith("<tr><td>os.name") ){
                                    res.put("OS", getValue(line) );
                            } else if (line.startsWith( "<tr><td>os.version") ){
                                    res.put("OSVer", getValue(line) );
                            } else if (line.startsWith("<tr><td>java.runtime.version") ){
                                    res.put("JDKVer", getValue(line) );
                            } else if (line.startsWith( "<tr><td>java.home") ){
                                    res.put("JDKPath", getValue(line) );
                            } else if (line.startsWith("<tr><td>localHost") ){
                                    res.put("Host", getValue(line) );
                            }
                    }
            } catch (IOException e){
                    cat.error("Error in getEnv. ", e);
            }
            return res;
    }
    String appendString( String in, String suf ){
            if (suf==null) return in;
            if (in==null) return suf;
            return in+EFS+suf;
    }
    Hashtable getTestList( String filename ) {
            Hashtable res= new Hashtable( );
            String pStr=null;
            String fStr = null;
            String eStr = null; /* we need establish mapping between error message and
fail list in the future. */
            String conPass = "Passed.";
            String conFail = "Failed.";
            try {
                    RandomAccessFile raf = new RandomAccessFile( filename, "r" );
                    int ind;
                    String line;
                    while ( (line=raf.readLine( ))!=null ){
                            if ( (ind=line.indexOf( conPass )) != -1 ) {
                                    pStr = appendString( pStr,
                                            line.substring(0, ind).trim( ) );
                            }else if ( (ind=line.indexOf( conFail )) != -1 ) {
                                    fStr = appendString( fStr,
                                            line.substring(0, ind).trim() + IFS +
                                            line.substring(ind+conFail.length( )).trim( ) );
                                    /*
                                    eStr = appendString( eStr,
                                            line.substring(ind+conFail.length( )).trim( ) );
                                    */
                            }
                    }
            } catch (IOException e){
                    cat.error("Error in getTestList: ", e);
            }
            if(pStr!=null)
                    res.put("Pass", pStr);
            if(fStr!=null)
                    res.put("Fail", fStr);
```

TABLE 9-continued

Exemplary Jtreg Parser

```
            if(eStr!=null)
                res.put("Error", eStr);
            return res;
        }
}
```

Figure 5A:
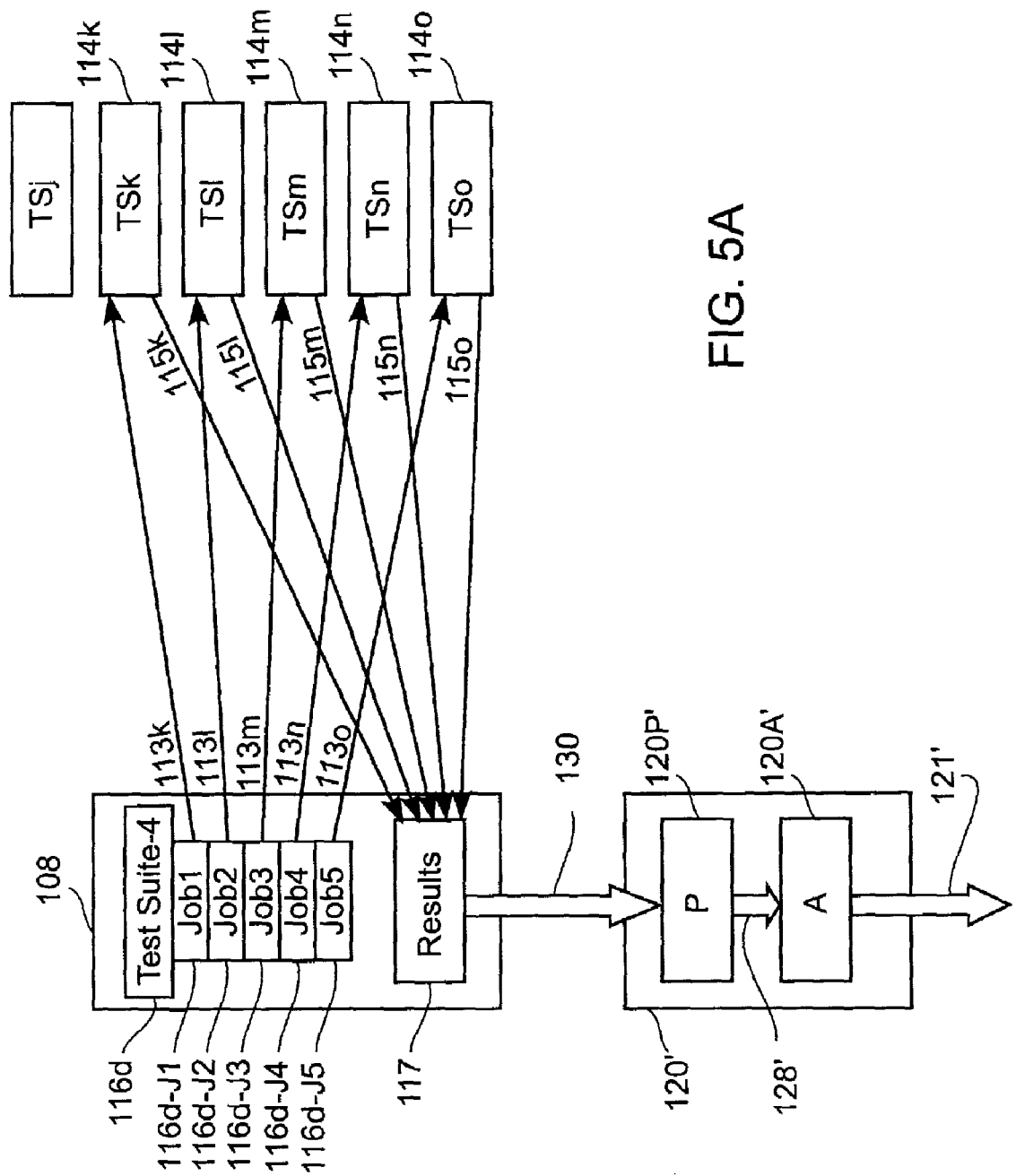
FIG. 5A is a block diagram showing the implementation of a separate computer system to process the test result files, in accordance with still another embodiment of the present invention.

Turning now to FIG. 5A, implementation of a separate computer system 120' to process the test result files can further be understood, in accordance with one embodiment of the present invention. By way of exemplary embodiment shown in FIG. 5A, a plurality of jobs 116d-J1 through 116d-J5 of a test suite 116d have been distributed to a plurality of test systems 114k–114o implementing a plurality of respective connectors 113k–113o. As illustrated, upon the test systems 114k–114o concluding the execution of the jobs 116d-J1 through 116d-J5, each test system generates a corresponding test result file 115k–115o, which in this embodiment, have been directed to a results component 117 of the system controller 108. This is specifically implemented as in this manner, a separate computer system can be implemented to parse and analyze data rather than the system controller of the DTF. In one embodiment, this configuration may be used specifically in situations where a predefined parser has not been defined for the specific test harness type.

The results 117 are then communicated to the data processing block 120' using 130. As shown, the data processing block 120' is defined in a computer system that is separate than the master computer system of the DTF.

In this embodiment, as discussed above, the test result data 130 is fed to a parser component 120P' which generates the valuable data 128', as communicated to the analyzer component 120A'. Upon parsing the valuable data 128', the analyzer component 120A' generates an identifiable test data 121'. By way of example, the embodiment of FIG. 5A is designed to be implemented to parse and analyze data of a test harness not having a Tonga or Jtreg predefined parser.

Figure 5B:
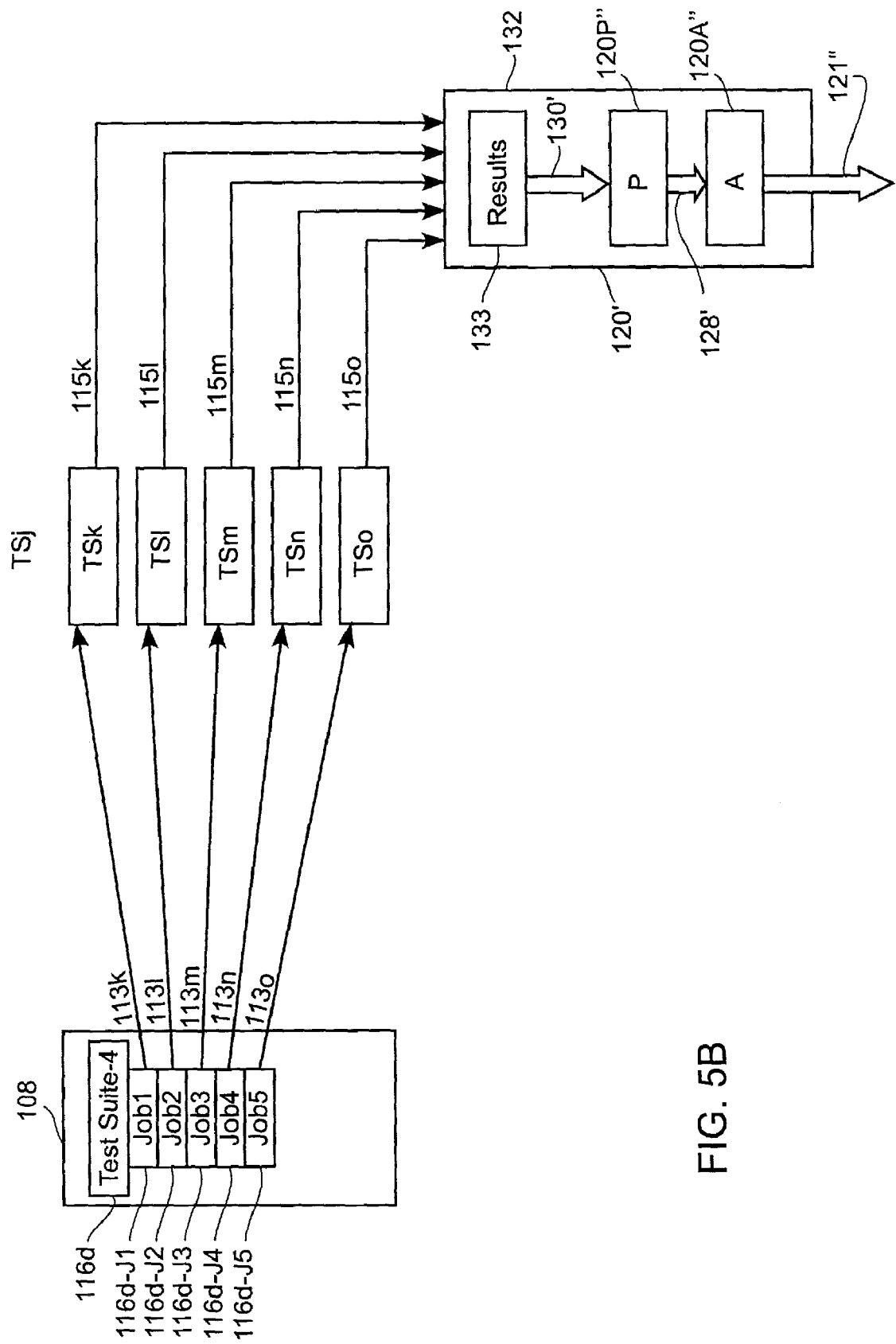
FIG. 5B is a block diagram showing the communication of the plurality of test results to a separate computer system for processing, in accordance to yet another embodiment of the present invention.

In an alternative embodiment shown in FIG. 5B, the plurality of test results 115k–115o may be communicated to a results component 133 of a separate computer system 132, in accordance with one embodiment of the present invention. Thereafter, the test results 133 are communicated to a parser component 120P" using a bus 130' which subsequently communicates the identifiable test data 121" to the analyzer component using the bus 128'. Upon conclusion of the analysis, the identifiable test data 121" is communicated to the memory structure 122.

Figure 6A:
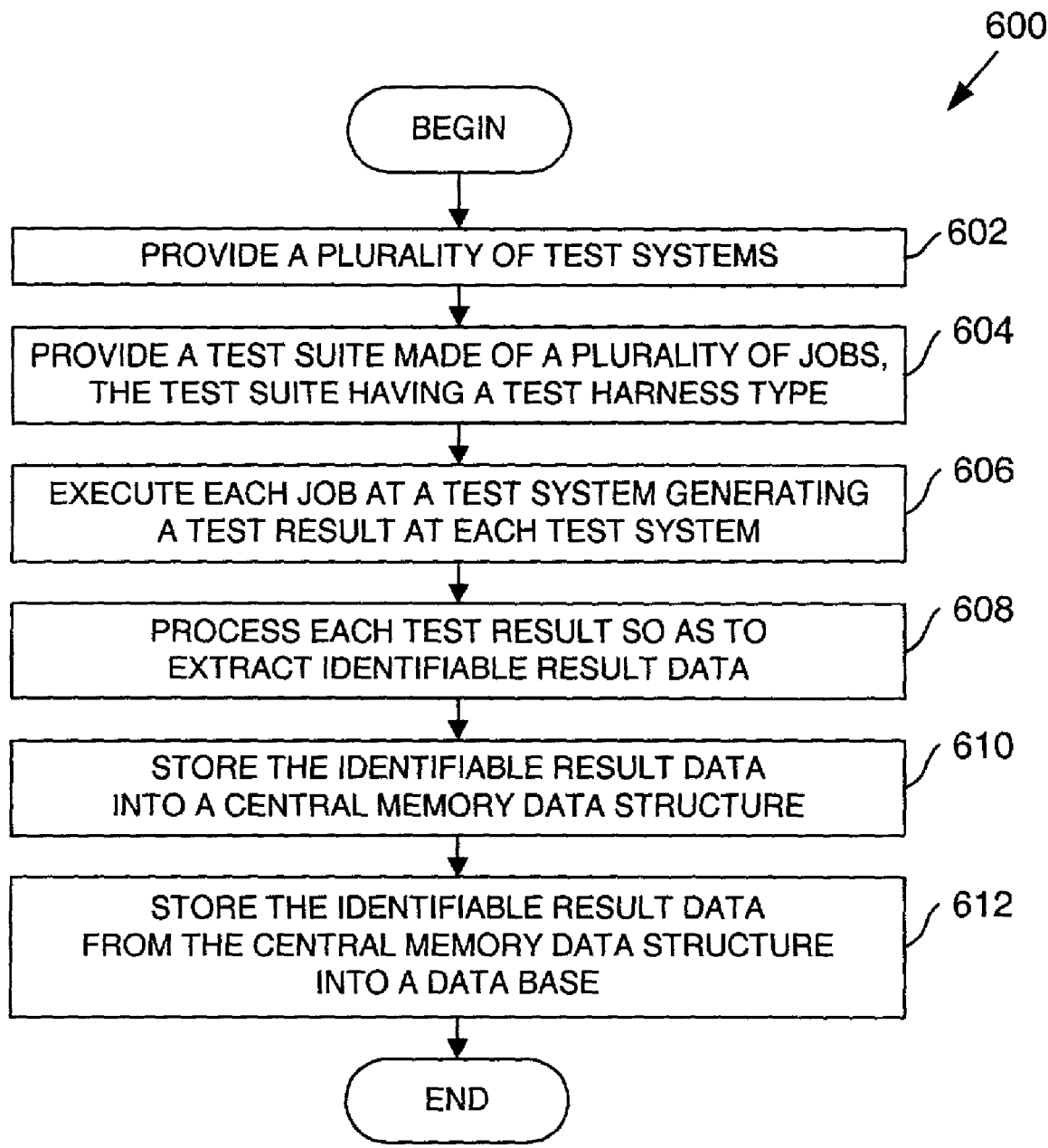
FIG. 6A is a flow chart diagram illustrating a method operations implemented in providing database connection in a DTF system, in accordance with yet another embodiment of the present invention.

Turning to FIG. 6A, a flow chart diagram 600 showing a method operations performed in forming a database connection in a distributed test framework system, in accordance with one embodiment of the present invention. The method begins in operation 602 in which a plurality of test systems are provided. Thereafter, in operation 604, a test suite having a plurality of jobs is provided. As described above, the test suite is configured to have an associated test harness type. For instance, in one embodiment, a test suite having a Tonga test harness type may be configured to be run on an IBM test machine.

Continuing to operation 606, each job is executed on a test system, generating a test result configured to reside at the associated test system. In one example, the test results may have an HTML format or a text file format. Next, in operation 608, each test result file is processed so as to produce the identifiable result data. Additional information regarding processing test result are provided below with respect to FIG. 6B.

Next, in operation 610, the identifiable result date is stored into a central memory data structure. In one instance, the central memory data structure is a temporary storage structure having a predefined format. By way of example, the central memory structure may be configured to be a hashtable. In this manner, easily identifiable and recognizable data are stored in the memory data structure, substantially reducing the user's control over the residing test result. Then, in operation 612, the identifiable result data is stored into a database. In this manner, a plurality of statistical data containing a summary of a plurality of test results may be obtained in substantially less time.

Figure 6B:
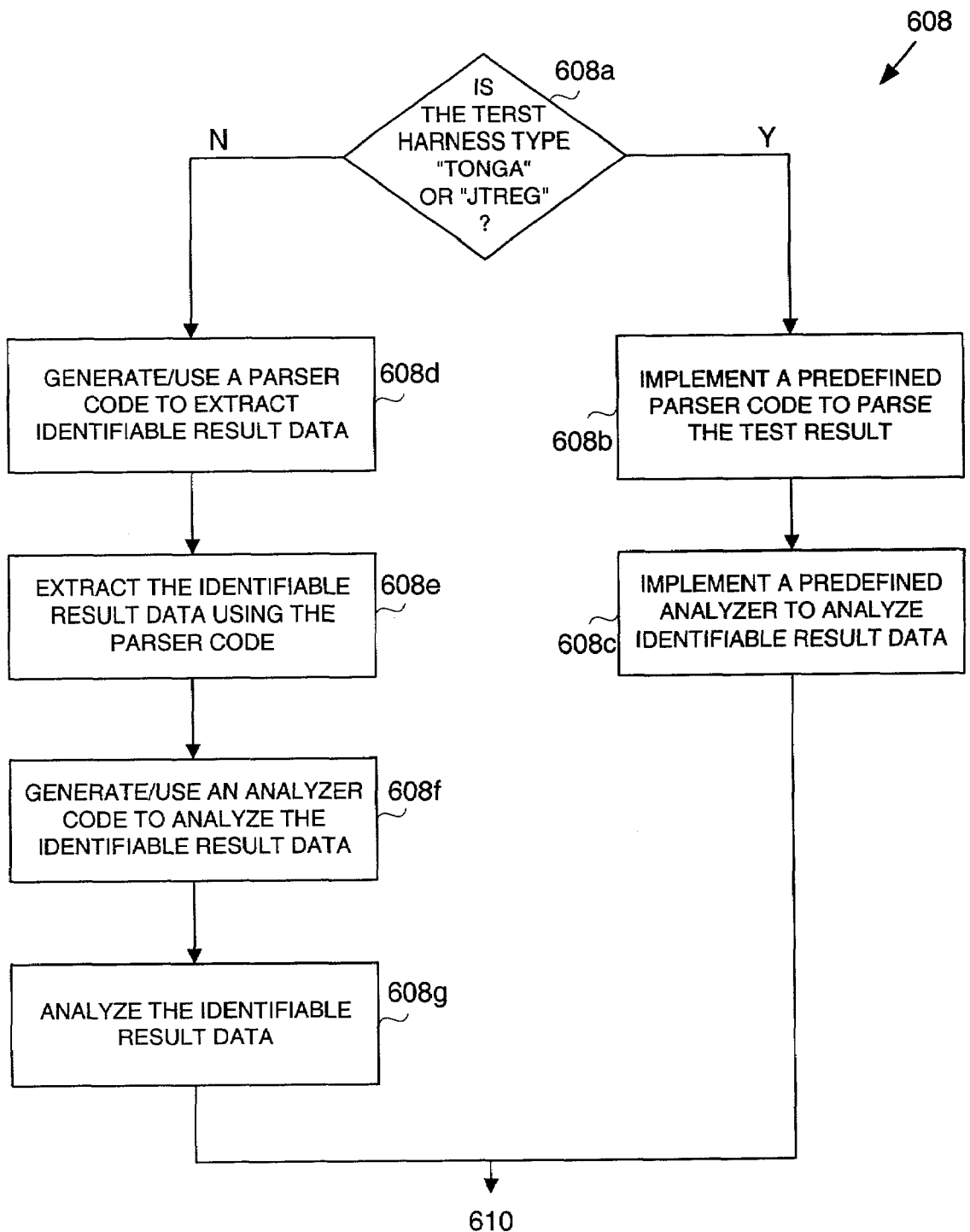
FIG. 6B is a flow chart diagram illustrating a method operations implemented in processing each test results file in a DTF system, in accordance with yet another embodiment of the present invention.

The processing of the result data can further be understood in view of the flow chart diagram of the method operations shown in FIG. 6B, in accordance with one embodiment of the present invention. As depicted, in operation 608a, a determination is made as to whether the test harness type of the job is "Tonga" or "Jtreg." If the test harness type is either "Tonga" or "Jtreg," in operation 608a, the predetermined parser code is implemented to parse the test result. That is, if the test harness type is Tonga," the Tonga predefined parser code is used while if the test harness type is "Jtreg," the Jtreg predefined parser type is implemented. Then, the method continues to operation 608c in which a predetermined analyzer code is implemented to analyze the identifiable result data. This is specifically beneficial as extensive identifiable result data files can be analyzed so as to produce a statistical or summary file substantially smaller than the original files.

If the test harness type is neither "Tonga" nor "Jtreg," the method continues to operation 608d, in which a parser code is generated/used to extract identifiable result data. Specifically, a parser code is generated if it is the first time that particular test harness type has been submitted for execution. However, in subsequent occasion, the method continues to use the previously generated parser code. Moving to operation 608a, the parser code is used to extract the identifiable result data.

Next, in operation 608f, an analyzer code is generated to analyze the identifiable result data. Again, similar to the parser code, the analyzer code is generated substantially only during its first time use. Then, in operation 608g, the analyzer code is implemented to analyze the identifiable result data. Thus, creating a substantially smaller file.

Thus, in accordance with embodiments of the present invention, test results produced by a plurality of test systems each having a different hardware/software configurations and platforms and defined in different buildings and localities are stored in a centralized database, substantially lim iting the control of users over the test result data. In this manner, valuable information stored in the database can easily be accessed thus substantially eliminating the need to manually review and analyze test result data.

The advantages of the present invention are numerous. Most notably, the database connection of the present invention substantially eliminates the user control over the test result data, thus substantially limiting the user control over the test result data residing on the test system. Another advantage is that the database connection of the present invention enables a computer system to automatically extract valuable data contained within each test result data file. In this manner, valuable data can easily be accessed thus substantially reducing the time required to analyze data. Yet another advantage of the data base connection of the present invention is that a faster system is provided as storing test results in the database optimizes the data retrieval operations.

Although the present invention mainly describes exemplary embodiments of a database connection in a distributed test framework system design to execute a test suite, it must be understood by one having ordinary skill in the art that the database connection of the present invention can be implemented in any distributed processing framework system used to run any type of computer process. Additionally, although the embodiments of the present invention implement one system controller, one having ordinary skill in the art must appreciate that in a different embodiment, any number of system controllers can be implemented. Additionally, although in one example the DTF system is called "KNigHT," in a different embodiment, the DTF system can be called any arbitrary name.

Additionally, although the present invention is described based on the Jini technology, other network technologies having the capability to create an ad-hoc group of test systems may be implemented (e.g., RMI, TCP/IP Sockets, etc.). Furthermore, although the present invention implements Java programming language, other programming languages may be used to implement the embodiments of the present invention (e.g., C, $C_{++}$ any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A system for analyzing test result data from a plurality of test systems, the plurality of test systems capable of producing the test result data in disparate formats, comprising:
   a data processing block designed to receive the test result data in the disparate formats to produce an identifiable result data;
   a memory data structure for storing the identifiable result data, the memory data structure configured to have a table format; and
   a database for storing the identifiable result data obtained from the memory data structure,
   wherein the identifiable result data has a uniform format for analyzing the test result data from the plurality of test systems.

2. A system for analyzing test result data from a plurality of test systems as recited in claim 1, wherein the data processing block includes,
   a parser component configured to parse the test result data so as to extract valuable data from the test result data.

3. A system for analyzing test result data from a plurality of test systems as recited in claim 2, wherein the data processing block further includes,
   an analyzer component configured to analyze valuable data from the test result data so as to produce the identifiable result data.

4. A system for analyzing test result data from a plurality of test systems as recited in claim 2, wherein the parser component implements a predefined parser code.

5. A system for analyzing test result data from a plurality of test systems as recited in claim 4, wherein the predefined parser code is one of Tonga parser code and Jtreg parser code.

6. A system for analyzing test result data from a plurality of test systems as recited in claim 1, wherein the memory data structure is a hashtable.

7. A system for analyzing test result data from a plurality of test systems as recited in claim 1, wherein the memory data structure is a temporary data storage medium.

8. A system for analyzing test result data from a plurality of test systems as recited in claim 1, wherein the system is implemented in a distributed test framework system.

9. A system for analyzing test result data from a plurality of test systems, the plurality of test systems capable of producing the test result data in disparate formats, comprising:
   a data processing block designed to receive the test result data in the disparate formats to produce an identifiable result data, the data processing block including,
      a parser component configured to parse the test result data so as to extract valuable data from the test result data; and
      an analyzer component configured to analyze valuable data from the test result data so as to produce the identifiable result data;
   a memory data structure for storing the identifiable result data, the memory data structure configured to have a table format; and
   a database for storing the identifiable result data obtained from the memory data structure,
   wherein the identifiable result data has a uniform format for analyzing the test result data from the plurality of test systems.

10. A system for analyzing test result data from a plurality of test systems as recited in claim 9, wherein the memory data structure is a temporary data storage medium.

11. A system for analyzing test result data from a plurality of test systems as recited in claim 9, wherein the parser component implements a predefined parser code.

12. A system for analyzing test result data from a plurality of test systems as recited in claim 11, wherein the predefined parser code is one of Tonga parser code and Jtreg parser code.

13. A system for analyzing test result data from a plurality of test systems as recited in claim 11, wherein the database connection system is used in a distributed test framework system ("DTF").

14. A method for creating a database connection in a distributed test framework (DTF) system, the method comprising:

providing a test suite containing a plurality of jobs;

executing each of the plurality of jobs on a test system of a plurality of test systems, the executing configured to produce a test result file on each of the plurality of test systems;

processing each test result file so as to extract a respective identifiable result data;

storing the identifiable result data into a central memory data structure;

storing a data in the central memory data structure into a database.

15. The method of claim 14, wherein the test suite is configured to have a test harness type.

16. The method of claim 15, wherein processing each test result file so as to extract identifiable result data further includes, if the test harness type of the test suite is not one of "Tonga" and "Jtreg", generating a parser code to extract identifiable result data;

extracting the identifiable result data using the parser code;

generating an analyzer code to analyze the identifiable result data; and analyzing the identifiable result data.

17. The method of claim of claim 15, wherein the central memory data structure has a uniform format.

18. The method of claim 14, wherein processing each test result so as to extract identifiable result data includes, if the test harness type of the test suite is one of "Tonga" and "Jtreg,"

implementing a predefined parser code to parse the test result; and implementing a predefined analyzer to analyze the identifiable result data.

19. The method of claim 14, wherein the central memory data structure is a temporary memory storage.

20. The method of claim 19, wherein the central memory data structure is a hashtable.

* * * * *